US008485295B2

(12) United States Patent
Mildner

(10) Patent No.: US 8,485,295 B2
(45) Date of Patent: Jul. 16, 2013

(54) COOLING AIR GUIDE DEVICE FOR A MOTOR VEHICLE

(75) Inventor: Udo Mildner, Limburg (DE)

(73) Assignee: GM Global Technology Operations LLC, Detroit, MI (US)

(*) Notice: Subject to any disclaimer, the term of this patent is extended or adjusted under 35 U.S.C. 154(b) by 420 days.

(21) Appl. No.: 12/830,194

(22) Filed: Jul. 2, 2010

(65) Prior Publication Data

US 2011/0000728 A1 Jan. 6, 2011

(30) Foreign Application Priority Data

Jul. 6, 2009 (DE) .......................... 10 2009 031 746

(51) Int. Cl.
*B60K 11/06* (2006.01)
(52) U.S. Cl.
USPC ........................................ 180/68.1; 180/68.3
(58) Field of Classification Search
USPC ...................... 180/68.4, 68.6, 68.1, 68.2, 68.3
See application file for complete search history.

(56) References Cited

U.S. PATENT DOCUMENTS

| 4,646,863 | A  | * | 3/1987 | Yamada ...................... 180/68.1 |
| 5,326,133 | A  | * | 7/1994 | Breed et al. .................. 280/735 |
| 5,573,299 | A  | * | 11/1996 | Masuda .................... 296/193.09 |
| 6,880,655 | B2 | * | 4/2005 | Suwa et al. .................. 180/68.1 |
| 6,945,576 | B1 | * | 9/2005 | Arentzen ..................... 293/117 |
| 7,013,951 | B2 | * | 3/2006 | Bauer et al. .................... 165/41 |
| 7,114,587 | B2 | * | 10/2006 | Mori et al. ................... 180/68.3 |
| 7,410,018 | B2 | * | 8/2008 | Satou .......................... 180/68.4 |
| 7,455,351 | B2 | * | 11/2008 | Nakayama et al. ........ 296/193.1 |
| 8,128,153 | B2 | * | 3/2012 | Bernt et al. .............. 296/187.04 |
| 8,191,664 | B2 | * | 6/2012 | Steller .......................... 180/68.4 |
| 8,220,576 | B2 | * | 7/2012 | Terada et al. ................ 180/68.4 |
| 8,246,105 | B2 | * | 8/2012 | Mildner ................... 296/187.09 |
| 2002/0129981 | A1 | * | 9/2002 | Satou .......................... 180/68.6 |
| 2003/0188902 | A1 | | 10/2003 | Decuir |
| 2004/0084236 | A1 | * | 5/2004 | Okai et al. .................... 180/68.4 |
| 2004/0188155 | A1 | * | 9/2004 | Fujieda ........................ 180/68.4 |
| 2004/0195020 | A1 | * | 10/2004 | Suwa et al. .................. 180/68.4 |
| 2005/0215191 | A1 | | 9/2005 | Kino |
| 2009/0184526 | A1 | * | 7/2009 | Steller .......................... 293/115 |
| 2009/0266634 | A1 | * | 10/2009 | Obayashi et al. ............ 180/68.4 |

(Continued)

FOREIGN PATENT DOCUMENTS

| DE | 3024312 A1 | 1/1981 |
| DE | 4132570 A1 | 4/1993 |

(Continued)

OTHER PUBLICATIONS

German Patent Office, German Search Report for German Application No. 102009031746.5, Jul. 29, 2010.

*Primary Examiner* — Jeffrey J Restifo
(74) *Attorney, Agent, or Firm* — Ingrassia Fisher & Lorenz, P.C.

(57) ABSTRACT

A cooling air guide device is provided for a motor vehicle which, viewed in the travel direction of the vehicle, can be situated in front of at least one cooling component of the vehicle and has at least one first guide component, which can be situated on a load-bearing structural part of the vehicle and one second guide component, which is upstream from the first guide component in the travel direction. The second guide component protrudes at least regionally up to a bumper fascia and has a material which is more easily deformable than the first component.

20 Claims, 7 Drawing Sheets

U.S. PATENT DOCUMENTS

| | | | |
|---|---|---|---|
| 2010/0032220 A1* | 2/2010 | Ohira et al. | 180/68.3 |
| 2010/0078149 A1* | 4/2010 | Yoshimitsu et al. | 165/67 |
| 2010/0314426 A1* | 12/2010 | Yokoi et al. | 224/555 |
| 2011/0000728 A1* | 1/2011 | Mildner | 180/68.1 |

FOREIGN PATENT DOCUMENTS

| | | |
|---|---|---|
| DE | 4401643 A1 | 8/1994 |
| DE | 29821616 U1 | 2/1999 |
| DE | 10117278 A1 | 12/2001 |
| DE | 10310610 A1 | 12/2003 |
| DE | 10257857 A1 | 7/2004 |
| DE | 202007009464 U1 | 11/2008 |
| DE | 102007033116 A1 | 1/2009 |
| EP | 0779419 A2 | 6/1997 |
| EP | 1216872 A1 | 6/2002 |
| EP | 1352810 A2 | 10/2003 |
| EP | 1990225 A1 | 11/2008 |
| JP | 2002286392 A | 10/2002 |
| JP | 2004276701 A | 10/2004 |
| JP | 2007276659 A | 10/2007 |
| JP | 2008120369 A | 5/2008 |
| JP | 2008132960 A | 6/2008 |
| JP | 2008201324 A | 9/2008 |
| JP | 2008247122 A | 10/2008 |

* cited by examiner

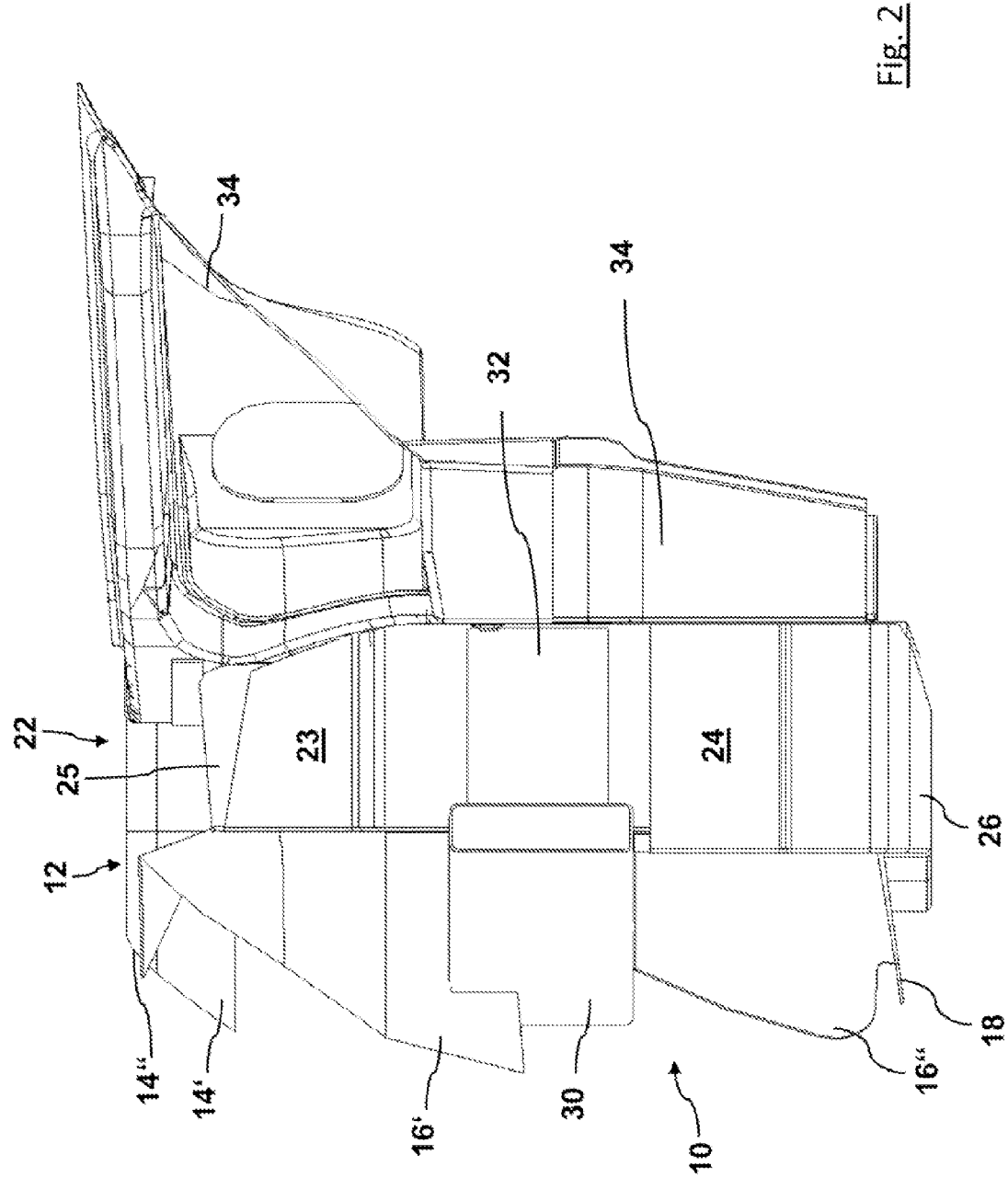

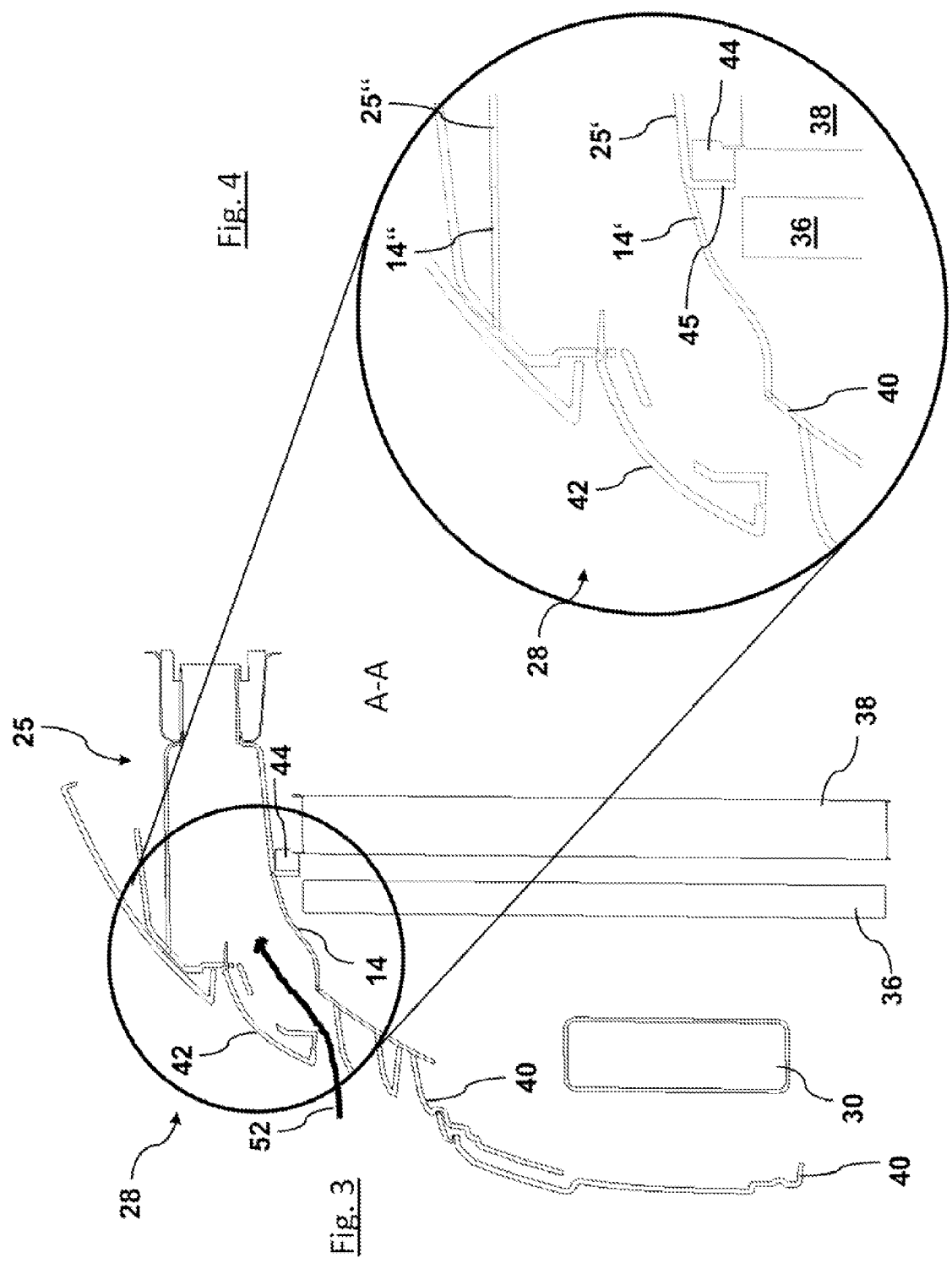

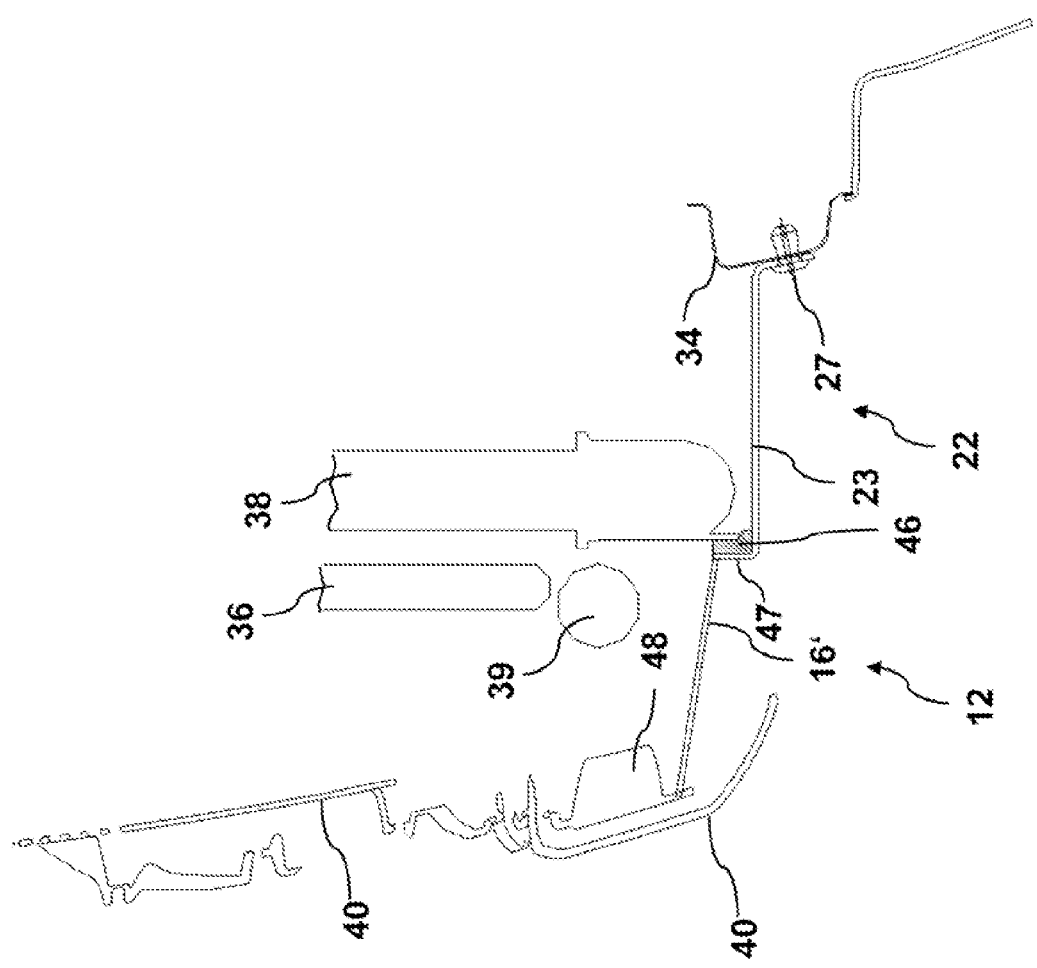

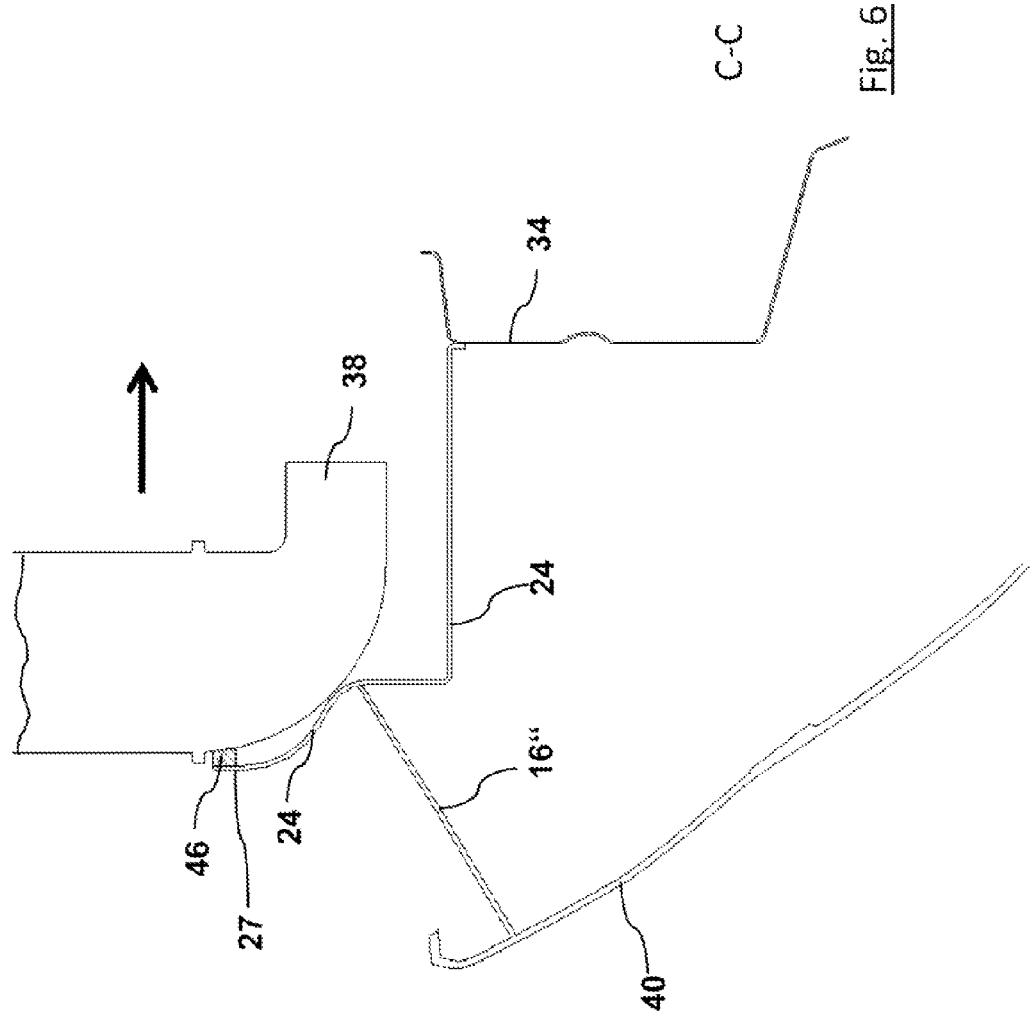

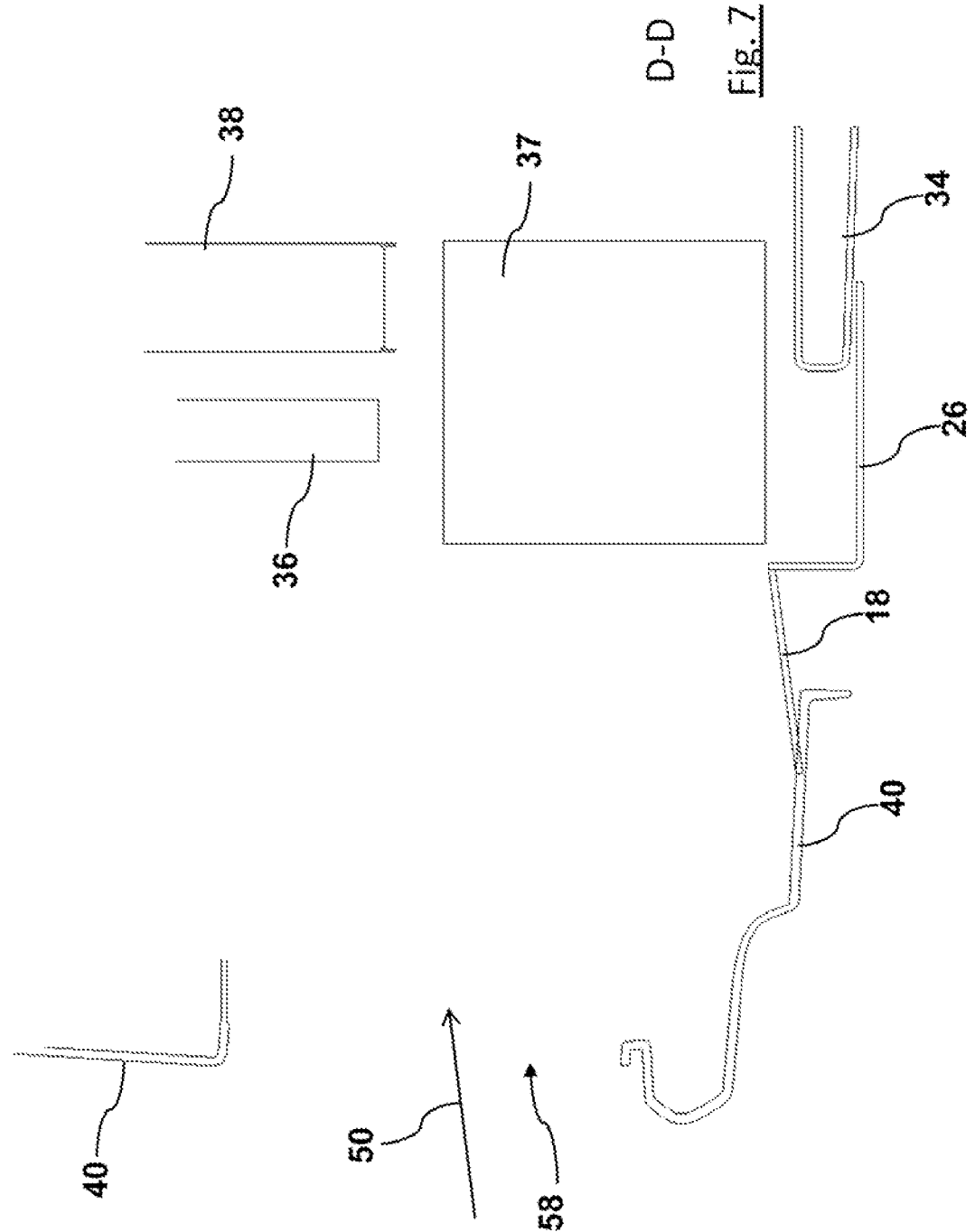

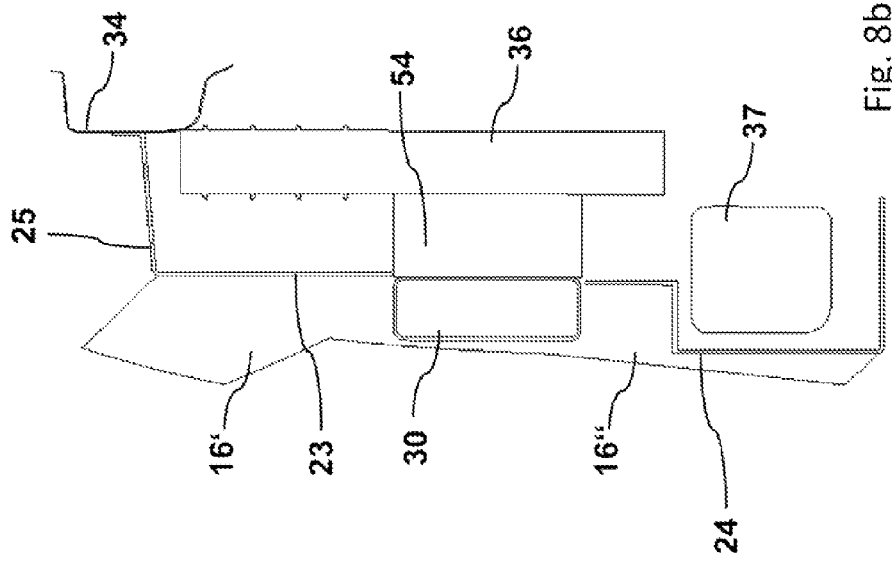
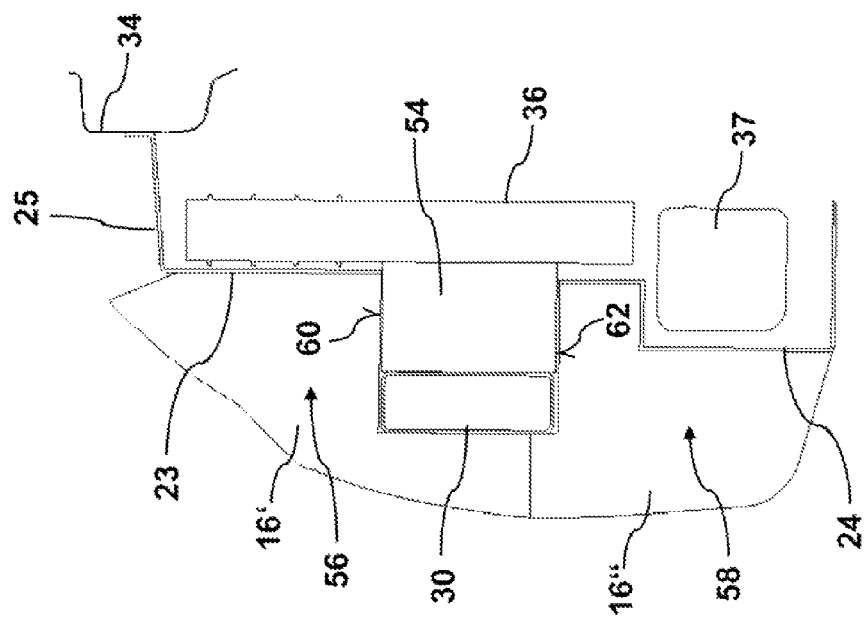

_COOLING AIR GUIDE DEVICE FOR A MOTOR VEHICLE_

CROSS-REFERENCE TO RELATED APPLICATION

This application claims priority to German Patent Application No. 102009031746.5, filed Jul. 6, 2009, which is incorporated herein by reference in its entirety.

TECHNICAL FIELD

The present invention relates to a cooling air guide device for a motor vehicle, which is situated upstream from at least one cooling component of the vehicle viewed in the travel direction of the vehicle.

BACKGROUND

Cooling air guide devices for motor vehicles provide a flow connection between air intake openings and the cooling components, such as heat exchangers of diverse cooling loops of the motor vehicle.

Vehicles are known that have a so-called hybrid front for receiving and fastening components of a cooling device or a cooling module. A cooling air guide is an integral component of the hybrid front. It is designed in such a manner that a polyurethane (PU) foam strip installed on the hybrid front, after installation of a bumper fascia, hermetically encloses cooling air openings provided in the panel or in the radiator grille and externally seals them and thus allows targeted air flow, which is as efficient as possible, through the cooling air guide to the cooling components.

In the case of such designs, it has been shown to be disadvantageous in particular in the event of vehicle collisions in the lower velocity range that the entire hybrid front is sometimes massively damaged due to the implementation of hybrid front and cooling air guide in the form of a single molded part. For repair purposes, the entire hybrid front must be replaced in these cases, which is accompanied by comparatively high repair costs.

Furthermore, a front end panel for a motor vehicle is known from DE 101 17 278 A is situated on the rear side of a bumper section to absorb an impact force, and acts on the front side of a vehicle. Moreover, the end panel has a panel body section produced from plastic and a guide channel section implemented integrally thereon, a heat exchanger being incorporated in the panel body section and the guide channel section protruding toward the front side of the vehicle, in order to guide air into the heat exchanger.

Furthermore, a flexible section is provided, which is situated on the end of the guide channel section and is integrally implemented together with the guide channel section, the flexible section being produced from flexible material, whose mechanical strength is less than that of the panel body section.

In the case of a configuration of this type, the impact forces arising during a collision occurring in the lower velocity range and acting on the bumper can be at least partially compensated for, in order to avoid damage to the front structure of the motor vehicle.

However, the individual cooling components are fixedly installed in the front structure and form a type of front module together with the bumper, which is fastened on the vehicle body structure behind it, for example, the longitudinal girders. Because of the comparatively rigid configuration of the cooling components on the front end panel, however, deformation and damage on the cooling components are already a concern in the case of collisions in the lower velocity range, which requires costly and sometimes complex repair of these components.

It is therefore at least one object of the present invention to provide a cooling air guide device for the cooling components of a motor vehicle which is improved with respect to crash behavior and with respect to its cooling-air-guiding properties. The cooling air guide device is to absorb collisions in the lower velocity range and also protect the cooling components from damage. Also provided is an improved air intake for the internal combustion engine of the vehicle and a cooling air guide which is optimized with respect to weight and cost outlay. In addition, other objects, improvements, desirable features, and characteristics will become apparent from the subsequent summary and detailed description, and the appended claims, taken in conjunction with the accompanying drawings and this background.

SUMMARY

The at least one object, other objects, improvements, desirable features, and characteristics is achieved by cooling air guide devices according to embodiments of the invention and by a front structure of a motor vehicle according to an embodiment of the invention and a motor vehicle according to an embodiment of the.

The cooling air guide device according to the invention is provided for a vehicle and is implemented to be situated on a vehicle front or on a front structure of a motor vehicle. The cooling air guide device preferably comes to rest in front of at least one cooling component of the vehicle, viewed in the travel direction of the vehicle, in the installed position. Cooling components are to be understood in the meaning of the present invention as the components of diverse cooling loops of the motor vehicle, in particular diverse heat exchangers, such as a water-cooled radiator, a charge air cooler, or a condenser of an air-conditioning system.

The cooling air guide device has at least two air-guiding guide components, the first guide component being able to be situated on a load-bearing structural part of the vehicle and the second guide component being fastened on the first guide component and/or being integrally connected thereto. The second guide component is situated upstream from the first guide component in the travel direction.

It is particularly provided that the second guide component comprises a material which is more easily deformable than the first component and protrudes at least regionally forward, viewed in the travel direction, in the interior on a bumper fascia of the vehicle. Furthermore, it can be provided that at least the second guide component, in relation to the cross-section of the cooling air guide which can have flow through it, protrudes peripherally toward the bumper fascia and/or encompassing the flow cross-section, in particular presses airtight thereon. The comparatively soft and deformable, preferably elastically deformable second guide component thus provides a molded part which compensates for component tolerances and seals, and which allows the most efficient and loss-free air supply possible to the cooling components to be cooled.

Furthermore, the deformability of the second guide component can be achieved in that vehicle collisions in the lower velocity range may be compensated for by a deformation of the second guide component, so that the first guide component and/or the cooling components of the motor vehicle remain largely free of damage in the event of collisions of this type, and any repairs may be performed with the replacement of the lowest possible number of parts in a cost-effective manner.

Furthermore, it is provided that the first and second guide components are implemented as plastic injection molded parts. For this purpose, a multi-component injection molding method is to be provided in particular. Using a two-component or multi-component injection molding method, the first guide component and the second guide component can also advantageously be implemented as sections of a one-piece plastic molded part.

The use of a comparatively hard plastic, such as polypropylene, is provided for the first guide component, the first guide component also being able to be provided with fiber reinforcement and optionally with structure-stiffening elements, such as stiffening ribs. In contrast, for the second guide component, the use of much more elastic and/or easily deformable plastic materials is preferably provided, such as thermoplastic elastomeric materials.

According to a first embodiment of the invention, it is provided that a bumper girder situated in front of the cooling components in the travel direction is embedded in the second guide component, enclosed thereby, and/or penetrates it in the vehicle transverse direction. Through the mutual attachment of the cooling air guide device to the bumper girder via the second guide component, for example, in the event of a collision-related displacement or deformation of the bumper girder, the first guide component, but particularly the cooling components or load-bearing frontal structural parts of the vehicle lying behind it remain harmless and undamaged as much as possible.

According to another embodiment of the invention, it is particularly provided that the plastic molded part comprising the first and second guide components is fastenable as a separate module on the frontal load-bearing structural part of the vehicle. In case of collision, which is accompanied by a deformation of at least the second guide component, restoration and repair can be performed solely by replacing the plastic molded part, while the remaining front structure and optionally also the cooling components situated thereon remain extensively free of damage.

According to a further embodiment of the invention, at least one deformable damping element is situated between a bumper girder and the at least one cooling component, such as a heat exchanger of one of the diverse cooling loops of the vehicle. A direct mechanical operational link between the bumper girder and typically the cooling components lying furthest to the front, such as a condenser of a vehicle air-conditioning system, is provided using the damping element.

Furthermore, it is preferably provided that at least the cooling component, preferably even a cooling module having the component, is mounted so it is displaceable on the load-bearing structural part in the vehicle longitudinal direction and is fastened thereon. In case of collision, this has an advantageous effect in that a collision-related deformed bumper girder or a bumper girder displaced in the vehicle longitudinal direction relays the deformation or displacement in damped and attenuated form to the cooling component lying in front or the entire cooling module lying behind it, whereby the cooling component or the cooling module may be displaced comparatively "softly" into a collision position, which is displaced to the rear in relation to its installed position.

Furthermore, it is provided in this context that the damping element is implemented for the purpose of transmitting a deformation oriented opposite to the travel direction and/or a corresponding displacement of the bumper girder to the at least one cooling component lying behind it in damped and/or attenuated form. This property of the damping element fulfills the purpose of displacing the cooling component to the rear with as little damage as possible in the event of a frontal collision.

The front structure and the cooling components situated thereon tend to have significantly less collision-related damage because of this configuration, however.

According to another embodiment of the invention, it is provided, inter alia, that the damping element is implemented as a preferably impact-absorbing foam layer which essentially extends regionally over the width of the cooling component. The damping element can first be compressed by a predefined amount under the effect of a collision-related force which displaces the bumper girder to the rear, before the acting forces reach a predefined force threshold, from which the cooling components or the cooling module are displaceable out of the installed location in the direction of the collision position.

According to another embodiment of the invention, the bumper girder and/or the damping element downstream there from are situated so they are displaceable in relation to the first guide component viewed in the vehicle longitudinal direction. In this way, for example, a collision-related displacement of the bumper girder and/or the damping element can be prevented from resulting in damage to the first guide component.

If the second guide component, which is upstream from the first guide component in the travel direction, is additionally implanted as sufficiently elastically deformable, it is even made possible according to the invention that in the event of a frontal vehicle collision, only the second guide component is subject to a reversible mechanical deformation, so that to restore the vehicle front, the plastic molded part comprising the two guide components does not even have to be replaced.

According to a further advantageous aspect of the invention, it is provided that the entire cooling air guide device is implemented in two parts and is divided into an upper guide channel, which lies above the bumper girder, and a lower guide channel, which lies below the bumper girder and extends in this area in the vehicle longitudinal direction. As a result, the cooling air guide device can be implemented in two parts viewed in the vertical direction, which allows a modular replacement of upper and lower guide channels, for example, for repair purposes.

Furthermore, it can be provided that each of the two guide channels has a first guide component and a second guide component upstream there from. Alternatively thereto, the second guide component can extend over the external circumference of both guide channels, both the upper and also the lower guide channels each having a separate first guide component. In embodiments in which the second, comparatively flexible guide component encloses the bumper girder or is penetrated thereby, the second guide component can preferably press against the bumper girder to form a seal. Suitable seal means may also be provided and situated in the transition area of second guide component and bumper girder.

According to another embodiment of the invention, it is additionally provided that the two guide channels, upper and lower guide channels, each have a first guide component, which are situated spaced apart from one another in the vertical direction. Furthermore, a lower side surface or side cheek of the damping element can form an upper boundary of the lower guide channel, and similarly thereto, an upper side surface or cheek of the damping element can form a lower boundary of the upper guide channel.

The two first guide components to be situated above and below the bumper girder are each to be implemented like a C-shaped molded part, their open side being oriented toward the bumper girder or toward the damping layer in each case and preferably even adjoining thereon.

According to a further advantageous embodiment of the invention, it is provided that a separate air intake channel for the internal combustion engine of the vehicle is integrated in the first and/or in the second guide component. This air intake channel is preferably integrated in the upper guide channel of the cooling air guide device, which comes to rest above the bumper girder. In particular, an upper or lateral wall of the second guide component can regionally merge into an air intake channel which is closed in the peripheral direction. The air intake channel provided for the internal combustion engine and the air guide channels formed by the first and/or second guide components may thus be implemented as interleaved in one another, the air intake channel provided for the internal combustion engine preferably being implemented in a boundary wall of the cooling air guide channel or being embedded therein.

Furthermore, according to a further, particularly advantageous embodiment of the invention, the second guide component and/or the air intake channel presses essentially airtight against the bumper fascia with a seal element optionally interposed. In this way, nearly all of the cooling air flowing in via ventilation openings can also actually be applied to the cooling components to be cooled, in particular the heat exchangers of diverse cooling loops of the motor vehicle.

Furthermore, through the frontal sealing contact of the air intake channel provided for the internal combustion engine on the bumper fascia, the fresh air flowing into the vehicle can be conducted directly into the intake area of the engine air intake. The air intake channel can be sealed separately to the air intakes integrated in the radiator grille or in the bumper fascia, so that intake of back-flowing air heated by the cooling components into the intake system for the engine air can be avoided.

According to a further embodiment of the invention, a cooling air guide device for a motor vehicle is provided, which, viewed in the travel direction of the vehicle, can be situated in front of at least one cooling component of the vehicle and has at least one first guide component, which can be situated on a load-bearing structural part of the vehicle, and one second guide component, which is upstream from the first guide component in the travel direction. A damping element is situated at least regionally upstream from the cooling component in the travel direction, which comes to rest in the installed position on the motor vehicle between the cooling component and a bumper girder, the damping element downstream from the bumper girder and/or the bumper girder, viewed in the vehicle longitudinal direction, being situated so they are displaceable in relation to the first guide component.

In this way, in particular in the event of frontal vehicle collisions at low velocity, a deformation and/or displacement of the bumper girder which is oriented opposite to the travel direction can be transmitted in damped or attenuated form to the cooling components lying behind it.

According to another embodiment of the invention, the damping element is implemented as a preferably shock-absorbing foam layer which extends at least regionally over the width of the cooling component. The foam layer or the shock-absorbing element can preferably extend over the width of the coolant tank of the cooling module lying behind it.

Furthermore, the cooling air guide device can be implemented in two parts and can have an upper guide channel lying above the bumper girder and a lower guide channel extending below the bumper girder, the damping element coming to rest between the upper and lower guide channels or corresponding guide components of the cooling air guide device, which essentially form the guide channels.

According to another embodiment of the invention relates to a front structure of a motor vehicle having a cooling air guide device according to an embodiment of the invention and having at least one cooling component, which is situated on the front structure so it is displaceable in the vehicle longitudinal direction or a correspondingly displaceably situated cooling module.

In addition, the a motor vehicle is provided in accordance with an embodiment of the invention having a cooling air guide device according to the invention and/or having a correspondingly equipped front structure.

BRIEF DESCRIPTION OF THE DRAWINGS

The present invention will hereinafter be described in conjunction with the following drawing figures, wherein like numerals denote like elements, and:

FIG. 2 shows a side view of the cooling air guide device from FIG. 1;

FIG. 3 shows a cross-sectional view of the cooling air guide from FIG. 1 along section line A-A;

FIG. 4 shows an enlarged illustrated detail from FIG. 3 in the area of an air intake;

FIG. 5 shows a cross-section through the cooling air guide along section line B-B from FIG. 1;

FIG. 6 shows a cross-sectional view along section line C-C from FIG. 1;

FIG. 7 shows a further cross-sectional view of the cooling air guide from FIG. 1 along section line D-D;

FIG. 8a shows a cross-section along cross-section line E-E from FIG. 1 in the installed position; and FIG. 8b shows a cross-section according to FIG. 8a after a frontal vehicle collision.

DETAILED DESCRIPTION

Figure 1:
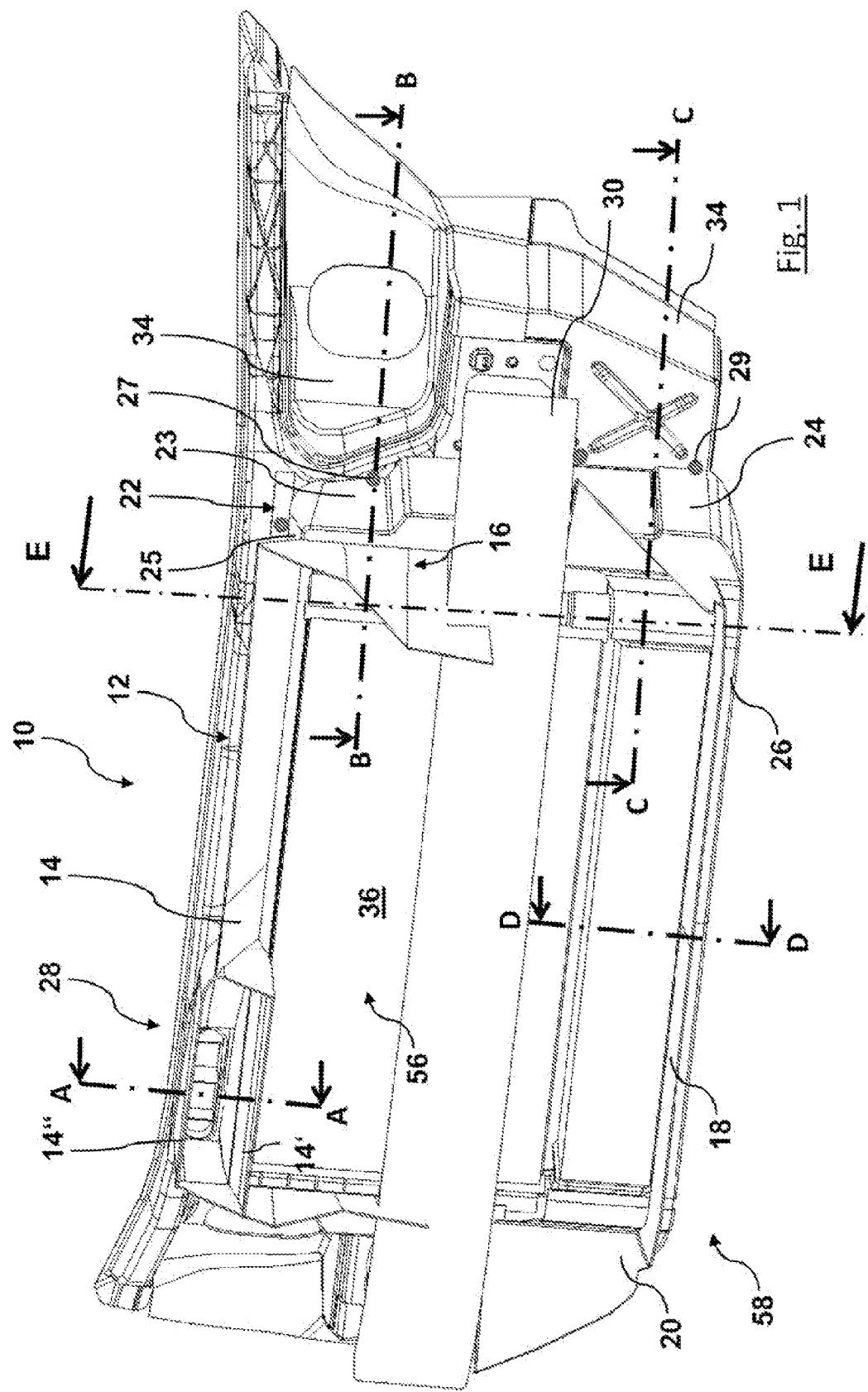
FIG. 1 shows a perspective view of the cooling air guide device situated on a front structure of a vehicle.

The following detailed description is merely exemplary in nature and is not intended to limit application and uses. Furthermore, there is no intention to be bound by any theory presented in the preceding background or summary or the following detailed description.

The cooling air guide device 10 shown in its entirety in both FIG. 1 and FIG. 2 has two guide components 12, 22 manufactured from different materials. The two guide components 12, 22 are preferably implemented as plastic molded parts using a two-component injection molding method. The first guide component 22, which can be situated directly on a load-bearing structural part 34 of the vehicle, comprises a comparatively hard and inflexible material, such as polypropylene, in comparison to the second guide component 12, which is upstream in the travel direction.

The second guide component 12 can form an integral plastic molded part together with the first guide component 22, which is fastenable as a separate module to the front structure and/or to the load-bearing front structural part 34 of the motor vehicle. Accordingly, individual fastening points 27, 29 are shown in FIG. 1, on which the plastic molded part can be fastened on the front structure 34 of the motor vehicle.

The second guide component 12, which is manufactured from a comparatively flexible material, such as a thermoplastic elastomeric material, has two side parts 16, 20, an upper part 14, and a lower part 18, which preferably merge integrally into one another and form a peripheral guide frame for the supplied and inflowing cooling air.

Correspondingly to the embodiment of the second guide component 12, the first guide component 22 also has a lower part 26, an upper part 25, and an upper and a lower side part 23, 24.

The front edge of the peripheral second guide component 12 pointing in the travel direction, which comes to rest on the left in the illustration of FIG. 2, preferably comes into contact to form a seal in an airtight manner on the bumper fascia 40, which is not explicitly shown in FIG. 1 and FIG. 2, but rather is only regionally indicated.

In this way, nearly all of the supplied cooling air which flows through the through openings situated in the bumper fascia 40 or leading through a radiator grille, can be supplied to the cooling components to be cooled, such as a condenser 36 or dryer 39 of an air-conditioning system, a water-cooled radiator 38, and/or a charge air cooler 37, as are indicated in FIG. 7.

The second guide component 12 lying in front has an air intake channel 28 for the internal combustion engine of the vehicle in its left upper end section. As a result, the upper part 14 of the front and flexible guide component 12 is divided in this area into a lower wall 14' and an upper wall 14" of the air intake channel 28. Furthermore, the lower wall 14' of the air intake channel 28 adjoins a corresponding downstream wall 25' of an upper wall 25 of the downstream first guide component 22 or merges therein, optionally forming an overlap area.

The upper wall 14" of the second guide component 22 behaves similarly, which merges into a corresponding upper wall 25", which adjoins to the rear, of the first guide component 22, as may be seen from a consideration of FIG. 2, FIG. 3, and FIG. 4 together. It is provided in particular that the separate air intake channel 28 provided for the internal combustion engine also comes into contact to form a seal on the radiator grille structure or on the bumper fascia 40, so that exclusively externally supplied, comparatively cold air reaches the intake system of the internal combustion engine. In this way, intake of back-flowing air which has already been heated by the cooling components 36, 37, 38, 39, for example, can be avoided.

Furthermore, the intake air 52 for the internal combustion engine which is flowing into the air intake channel 28 is indicated in FIG. 3. The air intake channel is additionally covered using a frontal fascia 42, which can be connected to the upper wall 14" of the upstream second guide component 12, for example.

Through the integrated configuration of the air intake channel 28 in the cooling air guide device 10 and in its second or first guide components 12, 22, the production and installation of a separate air intake channel provided for the internal combustion engine can be dispensed with in a way which saves effort and cost.

Furthermore, it can be seen in FIG. 1 and FIG. 2 that a bumper girder 30 is nearly completely embedded in the second guide component 12 or enclosed by its side parts 16, 20. Furthermore, the second, flexible guide component 12 lying in front can have an upper and a lower side part on each side, as shown in FIG. 2 on the basis of the right side part 16 having an upper side part section 16' and a lower side part section 16".

It can particularly be provided that the entire cooling air guide device 10 is also implemented in two parts in the vertical direction, the bumper girder 30 vertically dividing the cooling air guide device 10 into an upper channel 56 and a lower cooling air guide channel 58. Corresponding to the channel division, it can also be provided that at least the first guide component 22 is also implemented in two parts, as schematically shown on the basis of the illustration from FIG. 2 on the basis of an upper part 23 of the first guide component 22 and a lower part 24 of the first guide component 22.

Furthermore, a condenser 36 of an air-conditioning system of a motor vehicle is indicated lying behind the bumper girder 30 in FIG. 1.

The bumper girder 30 is fastened via an energy absorption element 32, typically referred to as a crash box, on the load-bearing structural part 34, such as a front structure of the motor vehicle. The energy absorption element 32 allows a displacement of the bumper girder 30 oriented opposite to the travel direction as a reaction to such collision forces acting from the vehicle front.

Furthermore, it can be seen in the two cross-sections according to FIG. 4 and FIG. 6 that the cooling components, such as the water-cooled radiator 38, can come into contact via a seal 44, 46 with a flange section 45, 47 on the guide component side. The inwardly protruding flange section 45, 47 is preferably provided in the transition area from first guide component 22 to the comparatively soft, optionally elastic second guide component 12.

The seal 44, 46 situated between water-cooled radiator 38 and first or second guide component 22, 12 is preferably implemented as peripheral, so that the airflow 50 supplied to the guide components 12, 22 does not flow laterally past the water-cooled radiator 38, but rather is forced to flow through it.

The sealing configuration of the second guide component to the bumper fascia 40 is shown in the two cross-sectional views along section line B-B from FIG. 5 or along section line C-C from FIG. 6. It may be seen in FIG. 5 that an upper lateral subsection 16' of the soft guide component 12 is connected or comes into contact via an additional seal 48 in an airtight manner which optionally compensates for tolerance dimensions with the bumper fascia 40, the so-called bumper fascia. In addition, the dryer 39 of the air-conditioning system, which is upstream from the water-cooled radiator 38 and is situated laterally to the condenser 36, is schematically shown in FIG. 5.

In the cross-section along section line C-C from FIG. 6, the second guide component has its lower lateral section 16" directly in contact with the bumper fascia 40 to form a seal, in contrast.

The first guide component 22 has a shaping, in particular on its upper and lower side parts 23, 24 which are schematically shown in FIG. 5 and FIG. 6, which allows a displacement of the cooling component 38 oriented opposite to the travel direction, without this resulting in damage to the first guide component 22. The inwardly protruding lateral flange section 47, but also the upper flange section 45, which protrudes downward and inward, of the first guide component 22 each come to rest upstream from the corresponding cooling component 38, which is connected thereto via a seal 44, 46, viewed in the travel direction.

Furthermore, it is shown in the two cross-sections according to FIG. 8a and FIG. 8b that the bumper girder 30 has a direct mechanical operational link via a deformable damping element 54, which can typically be implemented as foam, to the downstream cooling component 36. Upon occurrence of a collision-related frontal force, under the action of which the bumper girder 30 is displaced opposite to the travel direction, the foam part 54 is initially the object of a compression.

In the case a predefined load boundary is exceeded and in the case of force which can be transmitted via the foam part 54, the cooling component 36 detaches from its anchor and is displaced into a collision position, which is set back opposite to the travel direction, indicated in FIG. 8b. A displacement of the cooling component(s) 36, 38 of this type can occur largely without damage.

It is advantageous that the first air guide component 22 is implemented in two parts in particular and thus allows a displacement of the bumper girder and the foam part 54 between the parts of the guide component 22 in relation to the first guide component 22.

As shown by the comparison of both FIG. 8a and FIG. 8b, the contour and geometry of the first guide component 22, in particular that of its upper side part 23 and its lower side part 24, remain nearly unchanged, while the upper and lower side parts 16' and 16" of the second guide component 22 have become the object of a possibly reversible elastic deformation.

Furthermore, it can be provided that both the upper side 60 and also the lower side 62 of the damping element 54 form a boundary wall for an air guiding channel 56, 58 in each case. Thus, for example, the upper side 60 of the damping element 54 indicated in FIG. 8a can also form a lower side wall for the upper air guiding channel 56, while the lower side 62 of the damping element 54 provides a corresponding upper side boundary of the lower air guiding channel 58.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A cooling air guide device for a motor vehicle configured to guide air to at least one cooling component, comprising:
    at least one first guide component situated on a load-bearing structural part of the motor vehicle, the at least one first guide component situated upstream from the at least one cooling component in a travel direction; and
    a second guide component configured to be situated upstream from the at least one first guide component in the travel direction to form an air channel to the at least one cooling component from the second guide component through the at least one first guide component,
    wherein the second guide component is adapted to protrude at least regionally up to a bumper fascia and the second guide component comprises a material that is more easily deformable than the at least one first guide component.

2. The cooling air guide device according to claim 1, further comprising a bumper girder situated in front of the at least one cooling component in the travel direction and embedded in the second guide component.

3. The cooling air guide device according to claim 2, wherein the bumper girder or a damping element downstream there from are situated so as to b displaceable in relation to the at least one first guide component in a vehicle longitudinal direction.

4. The cooling air guide device according to claim 1, further comprising at least one deformable damping element situated between a bumper girder and the at least one cooling component.

5. The cooling air guide device according to claim 4, wherein the at least one deformable damping element is implemented as a foam layer that extends at least regionally over a width of the at least one cooling component.

6. The cooling air guide device according to claim 4, wherein a damping element is adapted to transmit a deformation or displacement of the bumper girder oriented opposite to the travel direction in a damped or attenuated form to the at least one cooling component.

7. The cooling air guide device according to claim 4, further comprising at least two first guide components that are situated spaced apart from one another in a vertical direction by a damping element, and an upper or a lower lateral surface of the damping element that form an upper boundary or a lower boundary of a upper guide channel or a lower guide channel.

8. The cooling air guide device according to claim 1, further comprising an upper guide channel lying above a bumper girder and a lower guide channel extending below the bumper girder.

9. The cooling air guide device according to claim 1, wherein a separate air intake channel for an internal combustion engine of the motor vehicle is integrated in the at least one first guide component or the second guide component.

10. The cooling air guide device according to claim 1, wherein the second guide component or an air intake channel press essentially airtight against the bumper fascia.

11. A cooling air guide device for a motor vehicle configured to guide air to at least one cooling component, comprising:
    at least one first guide component that can be situated on a load-bearing structural part of the motor vehicle, the at least one first guide component situated upstream from the at least one cooling component in a travel direction; and
    a second guide component configured to be situated upstream from the at least one first guide component in the travel direction to form an air channel to the at least one cooling component from the second guide component through the at least one first guide component;
    a damping element situated upstream from the at least one cooling component in the travel direction that coming to rest between the at least one cooling component and a bumper girder in an installed position on the motor vehicle, viewed in a vehicle longitudinal direction, is situated so as to be displaceable in relation to the at least one first guide component.

12. The cooling air guide device according to claim 11, wherein the damping element is adapted to transmit a deformation or displacement of the bumper girder oriented opposite to the travel direction in a damped or attenuated form to the at least one cooling component.

13. A motor vehicle, comprising:
    a front structure;
    at least one cooling component; and
    a cooling air guide device configured to guide air to the at least one cooling component and situated on the front structure so as to be displaceable in a vehicle longitudinal direction, the cooling air guide device comprising:
        at least one first guide component situated on a load-bearing structural part of the motor vehicle, the at least one first guide component situated upstream from the at least one cooling component in the vehicle longitudinal direction; and
        a second guide component configured to be situated upstream from the at least one first guide component in the vehicle longitudinal direction to form an air channel to the at least one cooling component from the second guide component through the at least one first guide component, wherein the second guide component is adapted to protrude at least regionally up to a bumper fascia and the second guide component comprises a material that is more easily deformable than the at least one first guide component.

14. The motor vehicle according to claim 13, further comprising a bumper girder situated in front of the at least one cooling component in the travel direction and embedded in the second guide component.

15. The motor vehicle according to claim 14, wherein the bumper girder or a damping element downstream there from are situated so as to b displaceable in relation to the at least one first guide component in the vehicle longitudinal direction.

16. The motor vehicle according to claim 13, further comprising at least one deformable damping element situated between a bumper girder and the at least one cooling component.

17. The motor vehicle according to claim 16, wherein the at least one deformable damping element is implemented as a foam layer that extends at least regionally over a width of the at least one cooling component.

18. The motor vehicle according to claim 16, wherein a damping element is adapted to transmit a deformation or displacement of the bumper girder oriented opposite to the travel direction in a damped or attenuated form to the at least one cooling component.

19. The motor vehicle according to claim 16, further comprising at least two first guide components that are situated spaced apart from one another in a vertical direction by a damping element, and an upper or a lower lateral surface of the damping element that form an upper or lower boundary of an upper guide channel or a lower guide channel.

20. The motor vehicle according to claim 13, further comprising an upper guide channel lying above a bumper girder and a lower guide channel extending below the bumper girder.

* * * * *